United States Patent Office 3,769,346
Patented Oct. 30, 1973

3,769,346
DIAMMONIUM SALTS AND PROCESS FOR PREPARATION
Jacques Robert Boissier, Paris, and Roger Robert Etienne Eugène Ratouis, Saint-Cloud, France, assignors to Societe Anonyme dite: Roussel-UCLAF, Paris, France
No Drawing. Continuation of abandoned application Ser. No. 344,247, Feb. 12, 1954. This application Sept. 4, 1968, Ser. No. 768,946
Int. Cl. C07c 87/14
U.S. Cl. 260—567.6 P 3 Claims

ABSTRACT OF THE DISCLOSURE

New compounds, N,N'-di-(2-aryloxyethyl)-N,N,N',N'-tetramethyl-alpha,omega - polymethylene diammonium salts, useful as antimicrobial agents, and a process for the preparation thereof are disclosed.

---

This application is a continuation of application Ser. No. 344,247, Feb. 12, 1954, now abandoned.

This invention relates to new diammonium salts, which have very interesting antimicrobial properties, and also to the process for the preparation thereof.

The present invention provides, as new compounds, N, N' - di(2 - aryloxyethyl)-N,N,N',N'-tetramethyl-$a,\omega$-polymethylene diammonium salts of the general formula:

$$\left[ R-CH_2-CH_2-\overset{\overset{\displaystyle CH_3}{|}}{\underset{\underset{\displaystyle CH_3}{|}}{N^+}}-(CH_2)_n-\overset{\overset{\displaystyle CH_3}{|}}{\underset{\underset{\displaystyle CH_3}{|}}{N^+}}-CH_2-CH_2-R \right] 2X^-$$
(I in which R is a phenoxy substituted, naphthoxy or naphthoxy substituted radical which may be substituted by one or more of the following substituents, namely halogen atoms and nitro, amino, sulphonic, hydroxy, lower alkoxy, lower alkyl; aryl, aralkyl, and aryloxy and aralkoxy radicals, containing at the most 9 carbon atoms, $n$ is an integer from 6 to 16 and X an equivalent of an acid anion.

X can be an equivalent of an anion of any organic or mineral acid, but it is advantageous for X to be an anion which provides diammonium salts which are soluble or easily solubilisable in the media in which they are intended to be used, for example, aqueous or ethanolic media in therapeutics. It will be then advantageous to use, for example, one of the following anions: halogenides, sulfates, phosphates, nitrates, acetates, propionates, tartrates, citrates, maleates, fumarates, succinates, adipates, arylsulfonates. sulfamates. Moreover, when the new compounds are intended to be used in medicine, it is preferred to select among these anions, those which are the more pharmaceutically acceptable, that is to say the best tolerated when normally used.

The method of preparation of the compounds having the above general Formula I, in which R and $n$ have the already mentioned meaning, and X represents an anion of a reactive acid is characterized in that a N-N dimethyl amine of formula:

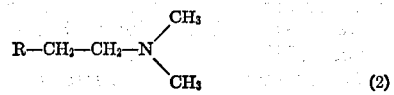
(2)

is reacted with a diester of formula:

 (3)

in which X represents an anion of a reacting acid. By anion of a reacting acid is meant an anion capable of quaternising directly the nitrogen atoms of the amine having Formula 2 under the conditions of the reaction; for example the anions chlorine, bromine, iodine, sulfates and sulfonates.

In carrying out the process, it is preferable to use a slight excess of the amine relative to the quantity stoichiometrically necessary for the reaction with the diester. Actually, if it is theoretically necessary to react the starting substances in the prooprtions of 2 mols of amine to 1 mol of diester, it is advantageous in practice to employ 2.1 to 2.2 mols of amine per mol of diester.

It is possible to work without using solvents and at room temperature, but it is preferable to effect the reaction in a solvent which promotes the quaternisation, (such as acetonitrile, an aliphatic ketone of low molecular weight or diethyl ether), and at the boiling point of the reaction medium.

The desired compound is isolated at the end of the reaction, usually by separation in solid form and then is purified by the usual methods.

When it is desired to prepare substances of the general Formula I, in which X is an anion which is non-reactive under the reaction conditions, the process takes place in two steps; in the first step, a substance of the general formula I is prepared, the cation of which is that of the desired product and the anion of which is that of a reactive acid, (for example an anion of strong mineral acid such as the Br⁻ anion), the said preparation being carried out by the process described above. Then, in a second step, the product obtained is treated either with a strong base (such as potassium hydroxide) in an anhydrous medium, or with a strong anion exchanger resin of the quaternary ammonium type, in hydroxide form, in order to transform the diammonium salt prepared in the first step into diammonium dihydroxide, the two reactive acid anions being replaced by two hydroxyl radicals; the diammonium dihydroxide is then neutralised by reacting it with at least two equivalents of the appropriate acid of the general formula HX and the desired product is isolated by the usual methods.

In practice, in order to obtain the substance of the general Formula I in which X is a non-reactive anion according to the meaning given above, it is preferred to use a brominated derivative as an intermediate derivative so that, in the first step of the process, the diammonium dibromide is prepared (the cation of which is that of the desired product) by condensing an N,N-dimethylamine on an α,ω-dibromoalkane; then, in a second step, the diammonium dibromide is converted into the diammonium dihydroxide, and finally neutralised by at least two equivalents of the appropriate acid HX.

The process described above is not directly applicable to the preparation of the substance of the general Formula I, in which R is a phenoxy or naphthoxy radical comprising at least one amino substituent. In this case, the diammonium salt in which the radical R comprises nitro substituents at the places selected for the future amino groups is prepared first of all by the general process, then the nitro group or groups is or are reduced to an amino group or groups with conventional reducing agents.

The new diammonium salts having the general Formula I possess a bacteriostatic and often bactericidal activity against many microorganisms; this activity is particularly interesting against many Gram positive germs, and notably against staphylococci. Accordingly, these new diammonium salts constitute new industrial compounds, useful as sterilizing and disinfecting agents; consequently, they can be used for antisepsy of rooms, instruments, tissues. They are then generally used by diluting in an appropriate vehicle, the concentrations in active product varying according to the derivative used and the action desired.

The properties of the new compounds are such that they constitute also remedies useful in human therapeutics, chiefly as local antiseptics, due to their action on many germs of the skin flora. They can then be used as active principles in several compositions, and particularly in those intended for local use, as skin or mucosa antisepsy and presented as solutions, suspensions, unguents, ointments, spray. . . . In these compositions, the active principle(s) is (are) associated to pharmaceutical excipients generally used in such compositions, and chosen according to the pharmaceutical form to be prepared. These excipients might be, for instance, aqueous or non aqueous solvents, stabilizing agents, wetting agents, petrolatum, lanolin, polyethylene glycols, . . . the active principal concentrations of the pharmaceutical forms so prepared may vary according to the derivative used, the nature of the prepared product and the indicated use; they may generally vary between 0.01% and 5%.

The bacteriostatic activity of the derivatives prepared as indicated in the examples below has been evaluated by the technique of dilution in agar, the product to be tested being diluted to variable concentration in melted agar maintained to 45° C., and the germs being inoculated on the surface after cooling the medium.

The results are given, for each product tested, in the tables attached after the examples. These tables give, for each of the germs examined, the minimum inhibiting concentration (M.I.C.) in microgram of active principle per milliliter of agar. This concentration is that causing an absence of growth in respect of the germ under consideration.

One of the derivatives according to the invention, namely N,N'-di-[2-(2-isopropyl-5-methylphenoxy) ethyl]-N,N,N',N'-tetramethyl-1,10-decamethylene diammonium dibromide, (hereinafter called substance 249–16) was more particularly studied and its bacteriostatic, bactericidal and fungistatic activities are as follows:

(a) Bacteriostatic power (microorganisms used: *Escherichia coli, Staphylococcus, Klebsiella pneumoniae, Shigella sonnei, Pseudomonas aeruginosa*)

The study was carried out in an F.D.A. liquid contact medium (Circular No. 198, U.S. Department of Agriculture) into which various dilutions of substance 249–16 and a given quantity of the microorganism were introduced. The pH of the medium was adjusted to 7.4. The following results give the minimum inhibiting concentrations in microgram per milliliter of broth, after incubation at 37° C. for 48 hours.

TABLE I

| *Escherichia coli* employed | Strains tested ($10^3$ microorganisms per ml. of broth) | | | | | |
|---|---|---|---|---|---|---|
| | IP [1] 5452, NCTC 9002 | IP [1] 6111, NCTC 86 | IP [1] 52,168 (111 B4) | IP [1] A224 (Monod) | SIFA 8002 | SIFA 8120 |
| M.I.C. in mcg. of substance 249/16 per ml. of broth | 50 | 5 | 5 | 10 | 50 | 5 |

[1] Institut —Pasteur.

TABLE II

| *Staphylococcus* employed | Strains tested ($10^3$ microorganisms per ml. of broth) | | | | | |
|---|---|---|---|---|---|---|
| | ATCC 6538 P, FDA 209 P | IP 5352, NCTC 6127 | IP 5354, NCTC 6130 | IP 5356, NCTC 6133 | IP 52148 | IP 52149 |
| M.I.C. mcg. of substance 249/16 per ml. of broth | 10 | 5 | 5 | 5 | 5 | 10 |

TABLE III

| *Klebsiella pneumoniae* employed | Strains tested ($10^7$ microorganisms per ml. of broth) | | | |
|---|---|---|---|---|
| | IP 52 145 | IP 525 | IP 52 146 | IP 53 153 |
| M.I.C. in mcg. of substance 249/16 per ml. of broth | 50 | 50 | 10 | 5 |

TABLE IV

| *Shigella sonnei* employed | Strains tested ($10^7$ microorganisms per ml. of broth) | | |
|---|---|---|---|
| | IP 5556 | IP 5144 | IP 5331 |
| M.I.C. in mcg. of substance 249/16 per ml. of broth | 10 | 10 | 10 |

TABLE V

| *Pseudomonas aeruginosa* employed | Strains tested ($10^7$ microorganisms per ml. of broth) | | | |
|---|---|---|---|---|
| | IP 5835 | IP A22 | IP 5837 | IP 5836 |
| M.I.C. in mcg. of substance 249/16 per ml. of broth | 50 | 50 | 50 | 25 |

(b) Bactericidal power

This was shown using the same microorganisms as before. This study was carried out in an F.D.A. liquid contact medium (Reddish, "Antiseptics, disinfectants, fungicides and sterilization," 1957, page 118) brought to pH 7.4, into which various dilutions of substance 249–16 and a given quantity of germs were introduced. After contact for 10 minutes at 20° C., the following two operations were carried out:

(1) Subcultures were prepared of 1 ml. of the above medium in 9 ml. of liquid lecithin medium, called "letheen broth" (Quisno, R., Am. J. Pharm. vol. 118, No. 1, 320–323 (1946) and Reddish, G—F—1957 p. 118, Philadelphia) in order to inhibit the substance 249–16 and to observe, after incubation for 48 hours at 37° C., the so-called 100% lethal action.

(2) Subculture were prepared in appropriate dilutions and in an agar medium with lecithin called "letheen agar" (Reddish, 1957), in order to proceed with a count of the surviving germs as compared with control dilutions, in accordance with the method described by M. Karraz, A. Bertoye, J. Viallier, A. L. Courtieu (Premier Congrès Mondial de Détergence Paris 1954, p. 786–788). It was possible in this way to obtain the percentage of lethal action of the substance 249–16.

The resultats are given in the following table.

TABLE VI

| Microorganism studied | Subcultures of 1 ml. in 9 ml. of "letheen broth," stirring for 5 minutes with glass balls and incubation at 37° C., 48 hours | Subcultures in "letheen agar" after dilution and stirring in "letheen broth," with glass balls, for 5 minutes (incubation at 37° C., 48 hours) | | | |
|---|---|---|---|---|---|
| Microorganism studied—*E. Coli* IP A 224, 10⁸ microorganisms per ml. of broth | [1] 100 | [1] 99.999 | [1] 99.99 | [1] 99.9 | |
| Mcg. of substance 249–16 per ml. of medium | 200 | 100 | 50 | | |
| Microorganism studies—*Staphylococcus pyogenes*, var. aureus, A.T.C.C. 6538 P, F.D.A. 209 P, 10⁸ microorganisms per ml of broth | [1] 100 | [1] 99.999 | [1] 99.99 | [1] 99.9 | |
| Mcg. of substance 249–16 per ml. of medium | 200 | 100 | | 50 | |
| Microorganism studied—*K. pneumoniae* IP 52 145, 10⁷ microorganisms per ml. of broth | [1] 100 | [1] 99.999 | [1] 99.99 | [1] 99.9 | [1] 99 | [1] 90 |
| Mcg. of substance 149–16 per ml. of medium | 500 | 200 | | | 100 | 50 |
| Microorganism studied—*Sh. sonnei*, IP 5556, 10⁷ microorganisms per ml. of broth | [1] 100 | [1] 99.999 | [1] 99.99 | [1] 99.9 | [1] 99 | [1] 90 |
| Mcg. of substance 249–16 per ml. of medium | 500 | 200 | 100 | | | 50 |
| Microorganism studied—*Ps. aeruginosa*, IP 5834, IP A22, IP 5837, 10⁶ to 10⁸ microorganisms per ml. of broth | [1] 100 | [1] 99.999 | [1] 99.9 | [1] 99 | [1] 90 | |
| Mcg. of substance 249–16 per ml. of medium: | | | | | | |
| Ps. aer. IP 5835 | 1,000 | 1,000 | 500 | 200 | 100 | |
| Ps. aer. IP A22 | 1,000 | 1,000 | | | | |
| Ps. aer. IP 5837 | 500 | 200 | | 100 | | |

[1] Lethal action in percent.

(c) Fungistatic power

The fungistatic activity was shown on a number of agents of mycosis, in particular of human mycosis. The operation was carried out in a culture on Sabouraud's agar medium containing 20 parts per thousand of glucose with 10 mcg./ml., 100 mcg./ml. and 500 mcg./ml. of substance 249–16 and in the presence of controls. After a predetermined incubation period, the minimum inhibiting concentrations in mcg./ml. which bring about total inhibition of the growth of the fungus are defined. The results are given in the following table.

TABLE VII

| Microorganisms tested | Incubation time at 28° C., days | M.I.C. in mcg. of the product 249–16 per ml. of agar |
|---|---|---|
| *Aspergillus fumigatus*, IP 20 | 3 | >500 |
| *Candida albicans*, IP 628 | 3 | >500 |
| *Microsporum canis*, IP 432 | 7 | 100 |
| *Epidermophyton floccosum*, IP 454 | 6 | 100 |
| *Trichophyton mentagrophytes*, IP 402 | 5 | 500 |

EXAMPLE 1

A solution of 12 g. of N-2-(2-isopropyl-5-methylphenoxy)-ethyl dimethylamine and 6.1 g. of 1,6-dibromohexane in 100 cc. of methyl ethyl ketone was refluxed for 24 hours. The diammonium salt precipitated during the refluxing. The salt was allowed to cool and the white crystals were centrifuged out and washed with 50 cc. of methyl ethyl ketone. There were obtained 16 g. (89%) of N-N′-di-[2-(2-isopropyl-5-methylphenoxy)-ethyl] N-N-N′-N′ - tetramethyl - 1,6 - hexamethylene-diammonium dibromide, which melted at 207–209° C, on a heating stage microscope.

Analysis.—Calcd. $C_{34}H_{58}Br_2N_2O_2$ (percent): C, 59.47; H, 8.51. Found (percent): C, 59.4; H, 8.8.

EXAMPLE 2

The solution of 14 g. of N-2-(4-chlorophenoxy) ethyl dimethylamine and 10 g. of 1,10-dibromodecane in 100 cc. of acetone was refluxed for 6 hours. The diammonium salt precipitated during the refluxing. It was allowed to cool and then was centrifuged and recrystallised from 50 cc. of isopropanol. There were obtained 16.5 g. (71%) of N,N′-di-[2-(4-chlorophenoxy) ethyl] -N,N,N′,N′-tetramethyl-1,10 - decamethylene-diammonium dibromide, which melted at 178–180° C. on a heating stage microscope.

Analysis.—Calcd. $C_{30}H_{48}Br_2Cl_2N_2O_2$ (percent): C, 51.51; H, 6.92; Br, 22.85. Found (percent): C, 51.8; H, 7.3; Br, 23.0.

EXAMPLE 3

A solution of 268 g. of N-2-(2-benzyl phenoxy) ethyl dimethylamine and 150 g. of 1,10-dibromodecane in 1000 cc. of acetone was refluxed for 15 to 20 hours. The salt precipitated gradually in the form of an oil which was solidified by cooling. The crystals which formed were centrifuged, washed with acetone and dried. They were recrystallised from a mixture of acetone and ethanol and there were 320 g. (80°) of N,N′-di-[2-(2-benzyl phenoxy) ethyl]-N,N,N′,N′-tetramethyl-1,10-decamethylene diammonium dibromide, melting at 112–114° C. on a heating stage microscope.

Analysis.—Calcd. $C_{44}H_{62}Br_2N_2O_2$ (percent): C, 65.18; H, 7.71; Br, 19.71. Found (percent): C, 65.5; H, 7.9; Br, 19.7.

The $LD_{50}$ of the derivative, calculated after intravenous injection in a mouse, was 9.8 mg./kg.

EXAMPLE 4

A solution of 9.6 g. of N-2-(1-naphthoxy)-ethyl dimethylamine and 6 g. of 1,10-dibromodecane in 100 cc. of acetonitrile was refluxed for 15 hours. The diammonium salt precipitated during the refluxing. This was allowed to cool, was centrifuged and there were obtained 12.4 g. (85%) of N,N′-di[2-(1-naphthoxy)-ethyl]-N,N,N′,N′-tetramethyl-1,10- decamethylene-diammonium dibromide, which melted at 206–207° C. on a heating stage microscope.

Analysis.—Calcd. $C_{38}H_{54}Br_2N_2O_2$ (percent): C, 62.46; H, 7.4. Found (percent): C, 62.4; H, 7.4.

EXAMPLE 5

Using the procedure described in Example 4, and using 9.6 g. of N-2-(2-naphthoxy)-ethyl dimethylamine, there were obtained 12.7 g. (87%) of N,N'-di-[2-(2-naphthoxy)-ethyl]-N,N',N'-tetramethyl - 1,10 - decamethylene-diammonium dibromide, after centrifuging the crystals which were formed by cooling the acetonitrile solution. This produce melted at 174–175° C. on a heating stage microscope.

*Analysis.*—Calcd. $C_{38}H_{54}Br_2N_2O_2$ (percent): C, 62.46; H, 7.45. Found (percent): C, 62.55; H, 7.7.

EXAMPLE 6

Using the procedure described in Example 4, and using 10.1 g. of N-2-(3-phenylphenoxy)-ethyl dimethylamine, the diammonium salt precipitated during the refluxing. After filtration, there were obtained 14.1 g. (90%) of N,N' - d i- [2 - (4-phenylphenoxy)-ethyl]-N,N,N',N'-tetramethyl - 1,10 - decamethylene-diammonium dibromide, which melted at 197° C. on a heating stage microscope.

*Analysis.*—Calcd. $C_{42}H_{58}Br_2N_2O_2$ (percent): C, 64.44; H, 7.47. Found (percent): C, 64.1; H, 7.7.

EXAMPLE 7

A solution of 18.8 g. of N-2-(2-methylphenoxy)-ethyldimethyl amine and 15 g. of 1,10-dibromodecane in 150 cc. of acetone was refluxed for 15 hours and the diammonium salt precipitated during the refluxing. After filtration and recrystallisation from 50 cc. of water, there were obtained 19.3 g. (58.5%) of N,N'-di-[2-(2-methylphenoxy)-ethyl-N,N,N',N'-tetramethyl - 1,10 - decamethylene-diammonium dibromide, which melted at 208–209° C. on a heating stage microscope.

*Analysis.*—Calcd. $C_{32}H_{54}Br_2N_2O_2$ (percent): C, 58.35; H, 8.26. Found (percent): C, 58.35; H, 8.3.

EXAMPLE 8

Using the procedure described in Example 4 and starting from 20.5 g. of N-2-(4-methoxyphenoxy)-ethyl dimethylamine and 15 g. of 1,10-dibromodecane in 150 cc. of methylethylketone, there were obtained 30.6 g. (89%) of N,N' - di-[2-(4-methoxyphenoxy)ethyl]-N,N,N',N'-tetramethyl - 10 - decamethylene - diammonium dibromide, which melted at 135–137° C. on a heating stage microscope.

*Analysis.*—Calcd. $C_{32}H_{54}Br_2N_2O_4$ (percent): C, 55.65; H, 7.88. Found (percent): C, 55.2; H, 7.8.

EXAMPLE 9

Using the procedure described in Example 7 and employing 22 g. of N-2-(4-nitrophenoxy)-ethyl dimethylamine, there were obtained 21.6 g. (60%) of N,N'-di-[2-(4 - nitrophenoxy) - ethyl] - N,N,N',N' - tetramethyl-1,10-decamethylene-diammonium dibromide after crystalisation in 100 cc. of absolute ethanol. This product melted at 189–191° C. on a heating stage microscope.

*Analysis.*—Calcd. $C_{30}H_{48}Br_2N_4O_6$ (percent): C, 50.00; H, 6.71. Found (percent): C, 49.4; H, 7.1.

EXAMPLE 10

Starting from N,N' - di - [2-(2-benzylphenoxy)-ethyl]-N,N,N',N' - tetramethyl-decamethylene-diammonium dibromide obtained according to the process described in Example 3, the dihydroxide of this ammonium salt was first of all prepared by passing the starting material over a strong anion exchanger resin of the quaternary ammonium type, in the hydroxide form and prepared in methanol. For this purpose, a solution of 20 g. of the dibromide in 250 cc. of methanol was prepared and this solution was introduced into a column containing 625 cc. of Amberlite resin IRA 400 or 410, (Amberlite is a Registered Trademark). Elution was then carried out with 250 cc. of methanol and there was obtained a methanolic solution of N,N'-di-[2-(2-benzylphenoxy)-ethyl]-N,N,N',N'-tetramethyl - 1,10 - decamethylene-diammonium dihydroxide the titre of which was determined acidimetrically in non-aqueous medium with the aid of a perchloric acid solution in acetic acid, by working on an aliquot portion; thereafter, taking into account the titre obtained, the calculated quantity (2 Cl⁻ per mol of dihydroxide) of a hydrochloric acid solution in absolute ethanol was added to the methanolic solution of ammonium dihydroxide. Concentration to dryness was carried out in vacuo and the residue was recrystallised from a mixture of acetone and ethanol. There were obtained 8 g. (45%) of N,N'-di - [2-(2-benzylphenoxy)-ethyl]-N,N,N',N'-tetramethyl-1,10-decamethylene-diammonium dichloride, in the form of small white crystals which melted at 126–128° C. on a heating stage microscope.

*Analysis.*—Calcd. $C_{44}H_{62}Cl_2N_2O_2$ (percent): Cl, 9.82. Found (percent): Cl, 9.7.

The LD₅₀ calculated by the Behrens and Karber method, after intravenous injection into a mouse, was 4.2 mg./kg.

EXAMPLE 11

N,N' - di - [2-(2-benzylphenoxy) - ethyl] - N,N,N',N'-tetramethyl 1,10-decamethylene-diammonium dihydroxide was first of all prepared by the process described in Example 10.

After having determined the titre of the methanolic solution of dihydroxide, this solution was neutralised by adding the calculated quantity of propionic acid. Concentration to dryness under vacuum was carried out and there were obtained 18 g. of a crude salt, which was recrystallised from 50 cc. of methylethylketone. There were obtained 11 g. (56%) of N,N'-di-[2-(2-benzylphenoxy)-ethyl]-N,N,N',N'-tetramethyl-1,10-decamethylene - diammonium dipropionate in the form of slightly hygroscopic white crystals which melted at 98–100° C. on a heating stage microscope.

*Analysis.*—Calcd. $C_{50}H_{72}N_2O_6$ (percent): C, 75.34; H, 9.10. Found (percent): C, 75; H, 9.3.

The LD₅₀, calculated by the Behrens and Karber method, after intravenous injection into a mouse, was 6.3 mg./kg.

EXAMPLE 12

7.2 g. of N,N'-di-[2-(4-nitrophenoxy)-ethyl]-N,N,N'N'-tetramethyl-1,10-decamethylene-diammonium dibromide, prepared according to Example 9, and in solution in 200 cc. of 96 ethanol were reduced catalytically over 0.5 g. of Adams platinum.

Reduction was carried out at 60° C. and under a hydrogen pressure equal to one atmosphere. When the theoretical quantity of hydrogen had been absorbed, the catalyst was separated by filtration while hot and the solution allowed to cool. The precipitate formed was centrifuged and recrystallised from 200 cc. of 96 ethanol. There were obtained 4 g. (60%) of N,N'-di-[2-(4-aminophenoxy)-ethyl]-N,N,N',N'-tetramethyl-1,10 decamethylene-diammonium dibromide, which melted at 236–238° C., on a heating stage microscope.

*Analysis.*—Calcd. $C_{30}H_{52}Br_2N_4O_2$ (percent): C, 54.54; H, 7.94. Found (percent): C, 54.8; H, 8.3.

EXAMPLE 13

A solution of 10 g. of N-2-(4-fluorophenoxy)-ethyl dimethylamine and 7.5 g. of 1,10-dibromodecane in 150 cc. of methyl ethyl ketone was refluxed for 15 hours and the diammonium salt precipitated during the refluxing. After filtration and recrystallisation from 50 cc. of propan-2-ol, there were obtained 8.4 g. (50%) of N-N'-di-[2-(4-fluorophenoxy)ethyl]-N,N,N'-N'-tetramethyl-1,10-decamethylene-diammonium dibromide, which melted at 172–176° C. on a heating stage microscope.

*Analysis.*—Calcd. $C_{30}H_{48}Br_2F_2N_2O_2$ (percent): C, 54.06; H, 7.26. Found (percent): C, 53.5; H, 7.2.

Using a similar procedure the following compounds were obtained:

(1) N-N'-di-[2-(2-chlorophenoxy) - ethyl]-N-N-N'-N'-tetramethyl-1,10 decamethylene-diammonium dibromide of M.P. 210–214° C. was obtained after recrystallisation from absolute ethanol.

Analysis.—Calcd. $C_{30}H_{48}Br_2Cl_2N_2O_2$ (percent): C, 51.51; H, 6.92. Found (percent): C, 51.2; H, 7.2.

(2) N-N'-di-[2-(4-bromophenoxy) - ethyl]-N-N-N'-N'-tetramethyl-1,10 decamethylene-diammonium dibromide of M.P. 184–187° C. was obtained after recrystallisation from absolute ethanol.

Analysis.—Calcd. $C_{30}H_{48}Br_4N_2O_2$ (percent): C, 45.70; H, 6.14. Found (percent): C, 46.0; H, 6.5.

(3) N-N'-di-[2-(3-chlorophenoxy) - ethyl]-N-N-N'-N'-tetramethyl-1,10 decamethylene-diammonium dibromide of M.P. 170–174° C. was obtained after recrystallisation from propan-2-ol.

Analysis.—Calcd. $C_{30}H_{48}Br_2Cl_2N_2O_2$ (percent): C, 51.51; H, 6.92. Found (percent): C, 51.8; H, 6.5.

(4) N-N'-di-[2-(2,4-dichlorophenoxy) - ethyl]-N-N-N'-N'-tetramethyl-1,10 decamethylene-diammonium dibromide of M.P. 230–231° C. was obtained after recrystallisation from 96° ethanol.

Analysis.—Calcd. $C_{30}H_{46}Br_2Cl_4N_2O_2$ (percent): C, 46.89; H, 6.03. Found (percent): C, 47.0; H, 6.1.

(5) N-N'-di-[2-(3-methylphenoxy) - ethyl]-N-N-N'-N'-tetramethyl-1,10 decamethylene-diammonium dibromide of M.P. 125–130° C. was obtained after recrystallisation from propan-2-ol.

Analysis.—Calcd. $C_{32}H_{54}Br_2N_2O_2$ (percent): C, 58.35; H, 8.26. Found (percent): C, 58.3; H, 8.5.

(6) N-N'-di-[2-(4-methylphenoxy) - ethyl]-N-N-N'-N'-tetramethyl-1,10 decamethylene-diammonium dibromide of M.P. 174–177° C. was obtained.

Analysis.—Calcd. $C_{32}H_{54}Br_2N_2O_2$ (percent): C, 58.35; H, 8.26. Found (percent); C, 58.5; H, 8.1.

(7) N-N'-di-[2-(2-methyl 4-chlorophenoxy)-ethyl]-N-N-N'-N'-tetramethyl-1,10 decamethylene-diammonium dibromide of M.P. 216–220° C. was obtained after recrystallisation from 96° ethanol.

Analysis.—Calcd. $C_{32}H_{52}Br_2Cl_2N_2O_2$ (percent): C, 52.83; H, 7.20. Found (percent): C, 52.5; H, 7.2.

(8) N-N' - di - [2-(2-isopropyl-5-methylphenoxy)-ethyl]-N-N-N'-N'-tetramethyl-1,10 decamethylene-diammonium dibromide, which precipitated by cooling the solution, was obtained after recrystallisation from propan-2-ol M.P. 159–160° C. (herein above called substance 249–16).

Analysis.—Calcd. $C_{38}H_{66}Br_2N_2O_2$ (percent): C, 61.44; H, 8.96. Found (percent): C, 61.3; H, 8.95.

EXAMPLE 14

A solution of 10.6 g. of N-2-(3,5-dimethylphenoxy)-ethyl dimethyl amine and 7.5 g. of 1,10-dibromodecane in 150 cc. of acetonitrile was refluxed for 15 hours. After centrifuging the crystals which were formed by cooling the acetonitrile solution and after recrystallisation from 30 cc. acetonitrile there were obtained 10 g. (58%) of N-N'-di-[2-(3,5 dimethylphenoxy)-ethyl]-N-N-N'-N'-tetramethyl - 1,10 - decamethylene - diammonium dibromide which melted at 150–151° C. on a heating stage microscope.

Analysis.—Calcd. $C_{34}H_{58}Br_2N_2O_2$ (percent): C, 59.47; H, 8.51. Found (percent): C, 59.5; H, 8.7.

EXAMPLE 15

A solution of 12 g. of N-2-(2-isopropyl-5-methylphenoxy)-ethyl dimethylamine and 9.6 g. of 1,16-dibromohexadecane in 100 cc. of methyl ethyl ketone was refluxed for 48 hours. Concentration to dryness of the solution was carried out in vacuo and the residue was recrystallised from 150 cc. of boiling water. There were obtained 14 g. (68%) of N-N'-di-[2-(2-isopropyl-5-methylphenoxy)-ethyl]-N-N-N'-N'-tetramethyl-1,16 hexadecamethylene-diammonium dibromide, which melted at 188–190° C. on a heating stage microscope.

Analysis.—Calcd. $C_{44}H_{78}Br_2N_2O_2$ (percent): C, 63.90; H, 9.51. Found (percent): C, 63.4; H, 9.8.

EXAMPLE 16

The intermediate substituted 2-aryloxethyl dimethylamines which were used in the process of the invention were prepared by condensation of the appropriate phenol or naphtol (used as sodium phenate or naphtoate), with 2-dimethylamino-ethyl chloride according to well known procedures. The following were, for example, obtained:

2-(2-chlorophenoxy)-ethyl dimethylamine, B.p. 129–130° C. (10 mm.).

2-(3-chlorophenoxy)-ethyl dimethylamine, B.p. 124–126° C. (10 mm.).

2-(4-chlorophenoxy)-ethyl dimethylamine, B.p. 94–96° C. (0.1 mm.).

2-(4-fluorophenoxy)-ethyl dimethylamine, B.p. 106–108° C. (10 mm.).

2-(4-bromophenoxy)-ethyl dimethylamine, B.p. 140–141° C. (7 mm.).

2-(3-methylphenoxy)-ethyl dimethylamine, B.p. 113° C. (8 mm.).

2-(3,5-dimethylphenoxy)-ethyl dimethylamine, B.p. 120–121° C. (7 mm.).

2-(2-methyl 4-chlorophenoxy)-ethyl dimethylamine, B.p. 132–134° C. (7 mm.).

EXAMPLE 17

A solution of 150 g. (0.5 mol) of dibromodecane and of 233 g. (1.05 mol) of N-(2-thymyloxy-ethyl) dimethylamine in 2,000 ml. of methyl ethyl ketone was refluxed for 40 hours in a 5 liters balloon equipped with an ascending cooler. The warm solution was filtered on paper filter, then cooled during 48 hours at 5–10° C. while stirring. An important precipitate was formed, which was washed with methyl ethyl ketone and purified by the following method: the suspension of the above mentioned crude product was stirred during two hours in two liters of boiling methyl ethyl ketone. The precipitate was left 15 hours at 0° C. for settling, centrifuged out, washed with methyl ethyl ketone and dried 24 hours at 50° C. in a vacuum oven (under 20 mm. pressure). There were obtained 326 g. (88%) of N-N'-di-[2-(2-isopropyl 5-methyl phenoxy)-ethyl]-N-N-N'-N'-tetramethyl-1,10 decamethylene-diammonium dibromide, before purification, and 308 g. (83%) after the second purification. The compound was in the form of white crystals melting at 159–160° C. after the first purification and at 164–165° C. after the second one (microköfler).

Br (percent): Calculated, 21.52. Found, 21.2 and 21.5.

EXAMPLE 18

By dissolving directly the active compound in the solvent, an antiseptic solution was prepared, having the following composition:

N-N'-di-[2-(2-isopropyl 5 methyl phenoxy)-ethyl]-N-N-N'-N'-tetramethyl-1,10 decamethylene diammonium dibromide (249–16)—1 g.

Distilled water, to 1.000 ml.

EXAMPLE 19

An antiseptic solution was prepared, having the following composition:

N-N'-di-[2-(2-isopropyl 5-methylphenoxy)-ethyl]-N-N-N'-N'-tetramethyl-1,10 decamethylene diammonium dibromide (249–16)—1 g.

Polysorbate 80 (USP XVI, page 558)—10 g.

Distilled water, to 1.000 ml.

| Germs tested | Minimum inhibiting concentrations of the different products obtained in the given examples (in microgram per milliliter) | | | | | | | |
|---|---|---|---|---|---|---|---|---|
| | Ex. 2 | Ex. 3 | Ex. 4 | Ex. 5 | Ex. 6 | Ex. 7 | Ex. 10 | Ex. 11 |
| Staphylococcus: | | | | | | | | |
| 8006 clinically isolated | 10 | 10 | 10 | 10 | 10 | 10 | 1 | 1 |
| 8007 clinically isolated | 10 | 1 | 10 | 10 | 10 | 10 | 10 | 1 |
| 8008 clinically isolated | 10 | 1 | 10 | 10 | 10 | 10 | 10 | 1 |
| 8009 clinically isolated | 10 | 10 | 10 | 10 | 10 | 10 | 10 | 10 |
| 8026 clinically isolated | 10 | 1 | 1 | 1 | 10 | 1 | 1 | 1 |
| 8068 Oxford | 10 | 10 | 10 | 10 | 10 | 10 | 10 | 1 |
| 8069 Londres | 10 | 1 | 10 | 1 | 1 | 10 | 1 | 1 |
| 8167 A.T.C.C 12 228 | 10 | 1 | 10 | 10 | 10 | 10 | 1 | 1 |
| Streptococcus: | | | | | | | | |
| 8027 | >100 | 10 | >100 | >100 | 100 | >100 | 10 | 10 |
| 8028 (Enterococcus) | 100 | 10 | >100 | >100 | 100 | >100 | 10 | 100 |
| 8086 (Enterococcus) | 100 | 10 | >100 | >100 | 100 | >100 | 10 | 100 |
| Pasteurella multocida 8089 (aviaire) | >100 | >100 | >100 | >100 | 100 | >100 | >100 | >100 |
| Escherichia coli: | | | | | | | | |
| 8002 clinically isolated | 100 | >100 | >100 | >100 | >100 | 100 | >100 | >100 |
| 8018 Mac Leod IP | 10 | 10 | 100 | 10 | 100 | 10 | 10 | >100 |
| 8098 A 224 IP | 100 | >100 | >100 | >100 | >100 | 100 | >100 | 10 |
| 8124 clinically isolated | 100 | 100 | >100 | 100 | >100 | >100 | >100 | >100 |
| 8125 clinically isolated | >100 | 100 | >100 | >100 | >100 | >100 | >100 | >100 |
| 8308 Monod IP | 10 | 100 | >100 | 100 | >100 | 100 | 100 | >100 |
| Klebsiella pneumoniae 8019 FDA 208 | 10 | >100 | >100 | >100 | >100 | 10 | >100 | >100 |
| Eberthella typhosa 8024 | 10 | 100 | >100 | >100 | >100 | 100 | 100 | 100 |
| Shigella sonnei 8025 | 10 | 100 | >100 | >100 | >100 | 10 | 100 | 100 |
| Pseudomonas aeruginosa: | | | | | | | | |
| 8003 clinically isolated | >100 | >100 | >100 | >100 | >100 | >100 | >100 | >100 |
| 8005 clinically isolated | >100 | >100 | >100 | >100 | >100 | >100 | >100 | >100 |
| 8207 clinically isolated | >100 | >100 | >100 | >100 | >100 | >100 | >100 | >100 |
| 8248 clinically isolated | >100 | >100 | >100 | >100 | >100 | >100 | >100 | >100 |
| Proteus vulgaris 8137 clinically isolated | >100 | >100 | >100 | >100 | >100 | >100 | >100 | >100 |
| Proteus morganii: | | | | | | | | |
| 8180 A 231 IP | >100 | 100 | >100 | >100 | >100 | >100 | 100 | 100 |
| 8181 53 185 IP | >100 | >100 | >100 | >100 | >100 | >100 | >100 | >100 |
| Bacillus megatherium 8040 | 10 | 0,1 | 1 | 1 | 10 | 10 | 10 | 0,01 |

NOTE.—N.B.—8000 numbers refer to SIFA collection.

| Germs tested | Minimum inhibiting concentrations of the different products obtained in the given examples (in microgram per milliliter) | | | | | | | | |
|---|---|---|---|---|---|---|---|---|---|
| | Ex. 8 | Ex. 9 | Ex. 12 | Ex. 13 | Ex. 13 (1) | Ex. 13 (4) | Ex. 13 (5) | Ex. 13 (6) | Ex. 13 (8) |
| Staphylococcus 8069 (London) | 50 | 100 | >200 | 10 | 5 | 5 | 5 | 5 | 5 |
| Escherichia coli 8098 A 224 IP | >200 | >200 | >200 | 200 | 100 | 50 | 100 | 50 | 200 |
| Klebsiella pneumoniae: | | | | | | | | | |
| 8019 FDA 208 | 100 | >200 | >200 | 50 | 50 | 100 | 50 | 50 | 200 |
| 8034 SIFA | 100 | >200 | >200 | 50 | 50 | 100 | 50 | 50 | 200 |
| Salmonella typhi 8080 SIFA | >200 | >200 | >200 | 200 | 200 | 100 | 100 | 50 | 200 |

NOTE.—N.B.—8000 numbers refer to SIFA collection.

What is claimed is:
1. N - N' - di-[2-(2,4-dichlorophenoxy)-ethyl]-N-N-N'-N'-tetramethyl-1-1,10 decamethylene-diammonium dibromide.
2. N-N'-di-[2-(2-isopropyl-5-methylphenoxy)-ethyl]-N-N-N'-N'-tetramethyl-1,10 decamethylene-diammonium dibromide.
3. N-N'-di-[2-(2-methyl 4-chlorophenoxy)-ethyl]-N-N-N'-N'-tetramethyl-1,10 decamethylene-diammonium dibromide.

References Cited

UNITED STATES PATENTS 3,128,308    4/1964    Doub et al.

OTHER REFERENCES

Brauniger et al.: "Chemical Abstracts," vol. 54, pp. 548–9 (1960).

Palazzo et al.: "Chemical Abstracts," vol. 48, p. 6571 (1954).

LEON ZITVER, Primary Examiner

M. W. GLYNN, Assistant Examiner

U.S. Cl. X.R.

260—501.15; 424—316, 329

UNITED STATES PATENT OFFICE
CERTIFICATE OF CORRECTION

Patent No. 3,769,346　　　　　　　　　　Dated October 30, 1973

Inventor(s) Jacques Robert Boissier et al.

It is certified that error appears in the above-identified patent and that said Letters Patent are hereby corrected as shown below:

Column 1, line 36, after "alkyl" change ";" to -- , --.
　　　　　line 36, after "aralky" delete "and".

Column 7, line 8, "produce" should read -- product --.
　　　　　line 15, change "3" to -- 4 --.

Columns 11 and 12, under heading "Germs tested - Ex. 3"
　　　　　"8007 clinically isolated - 1" should read
　　　　　-- 8007 clinically isolated - 10 --.

Signed and sealed this 18th day of June 1974.

(SEAL)
Attest:

EDWARD M. FLETCHER, JR.　　　　　　　　C. MARSHALL DANN
Attesting Officer　　　　　　　　　　　Commissioner of Patents